(12) United States Patent
Honda

(10) Patent No.: US 8,928,910 B2
(45) Date of Patent: Jan. 6, 2015

(54) INFORMATION PROCESSING APPARATUS, CONTROL METHOD THEREFOR, AND COMPUTER READABLE MEDIUM FOR INDICATING A LAST PAGE AND BLANK PAGES IN BOOKBINDING PRINTING

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1261 days.

(21) Appl. No.: 12/260,797

(22) Filed: Oct. 29, 2008

(65) Prior Publication Data

US 2009/0116057 A1    May 7, 2009

(30) Foreign Application Priority Data

Nov. 1, 2007 (JP) .................................. 2007-285463

(51) Int. Cl.
*G06F 15/00* (2006.01)
*G06F 3/12* (2006.01)

(52) U.S. Cl.
CPC ............ *G06F 3/1264* (2013.01); *G06F 3/1204* (2013.01); *G06F 3/1208* (2013.01); *G06F 3/1215* (2013.01); *G06F 3/1254* (2013.01); *G06F 3/1257* (2013.01)
USPC ....................................... 358/1.15; 358/1.13

(58) Field of Classification Search
USPC .................................................. 358/1.1–1.16
See application file for complete search history.

(56) References Cited

U.S. PATENT DOCUMENTS

| | | | |
|---|---|---|---|
| 6,327,599 B1 * | 12/2001 | Warmus et al. ............... | 715/246 |
| 2001/0008602 A1 * | 7/2001 | Garrido ............................ | 412/9 |
| 2003/0056177 A1 * | 3/2003 | Nara et al. ..................... | 715/525 |
| 2003/0090707 A1 * | 5/2003 | Simpson et al. ............. | 358/1.15 |
| 2003/0189726 A1 * | 10/2003 | Kloosterman et al. ........ | 358/1.18 |
| 2008/0180701 A1 * | 7/2008 | Nakagiri et al. ............... | 358/1.9 |

FOREIGN PATENT DOCUMENTS

| | | |
|---|---|---|
| JP | 11-224027 | 8/1999 |
| JP | 2001-096833 A | 4/2001 |
| JP | 2003-276285 A | 9/2003 |

* cited by examiner

Primary Examiner — Benny Q Tieu
Assistant Examiner — Michael Y Tzeng
(74) Attorney, Agent, or Firm — Canon USA Inc. IP Division

(57) ABSTRACT

A user efficiently prints a book as desired during the generation of a job. When a form is assigned a flag indicating a last page of the book, a page containing the form assigned the flag is set as the last page of the book and is added to a number of pages that have already been drawn to calculate the total number of pages, and the number of blank pages necessary to place the page containing the form assigned the flag on the last page of the book is determined.

6 Claims, 17 Drawing Sheets

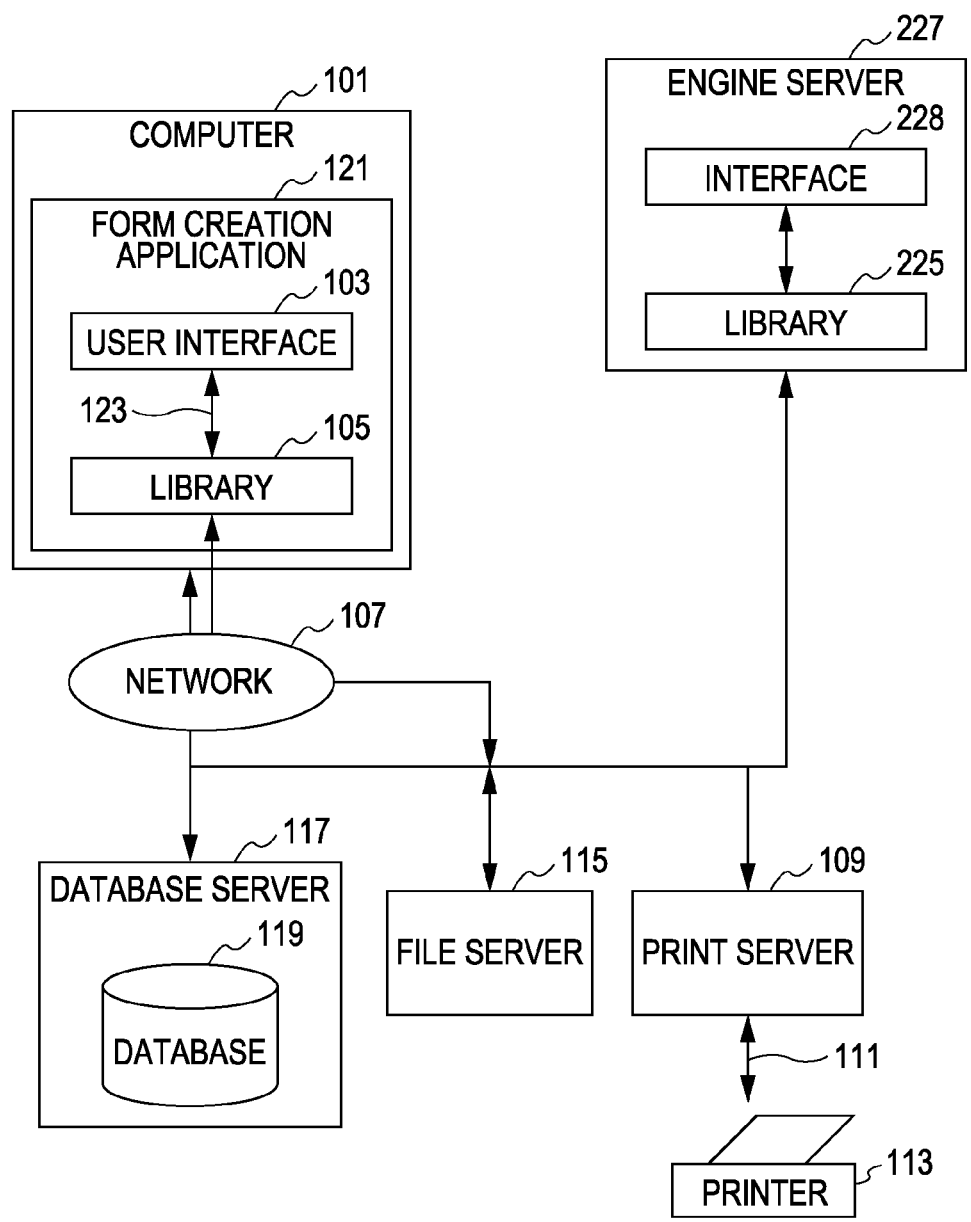

FIG. 3
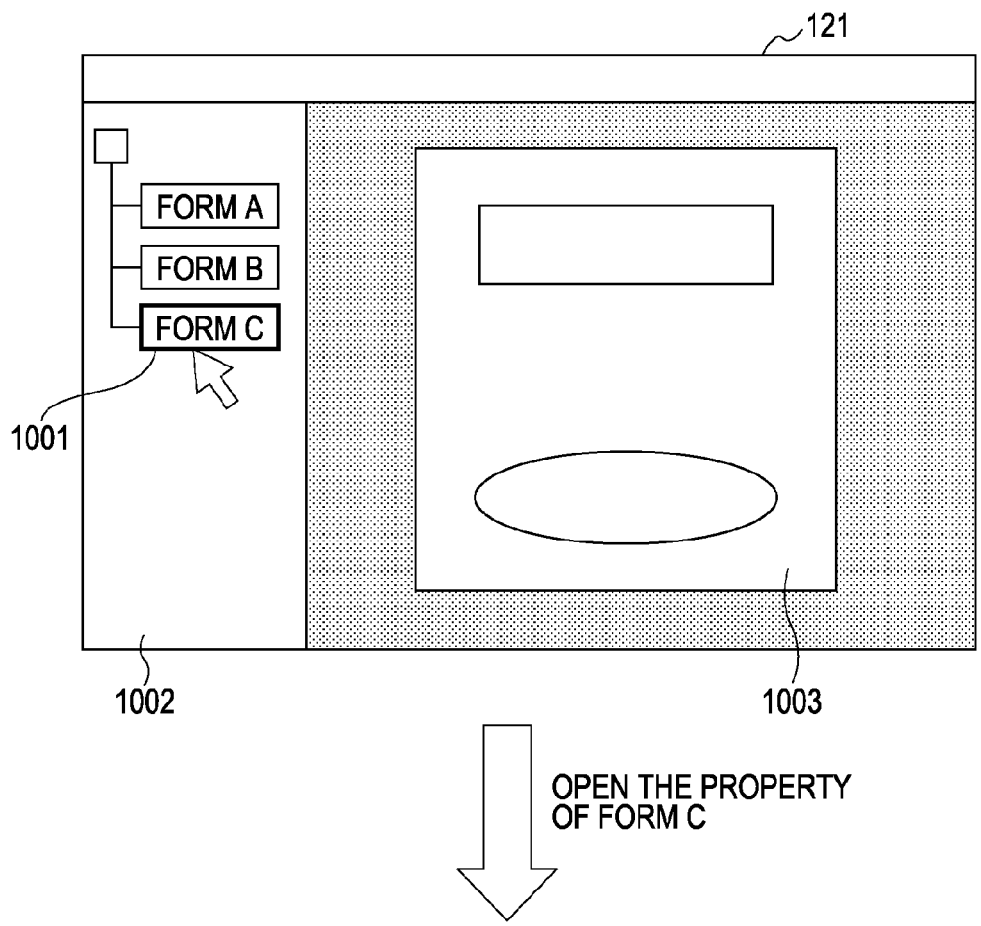
OPEN THE PROPERTY OF FORM C
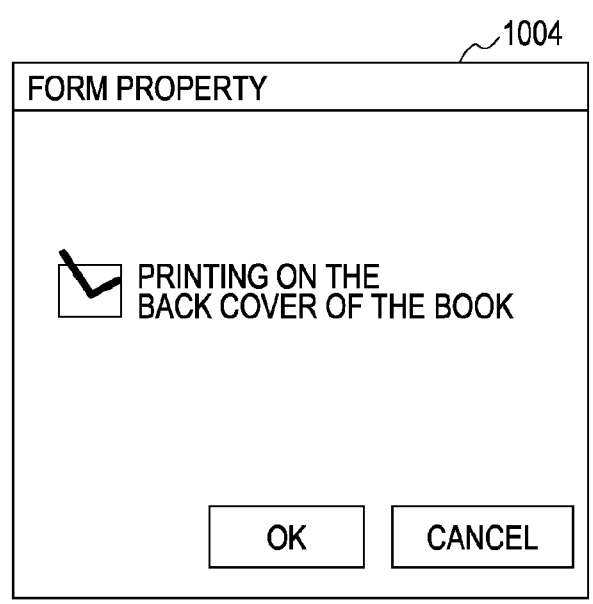

1301

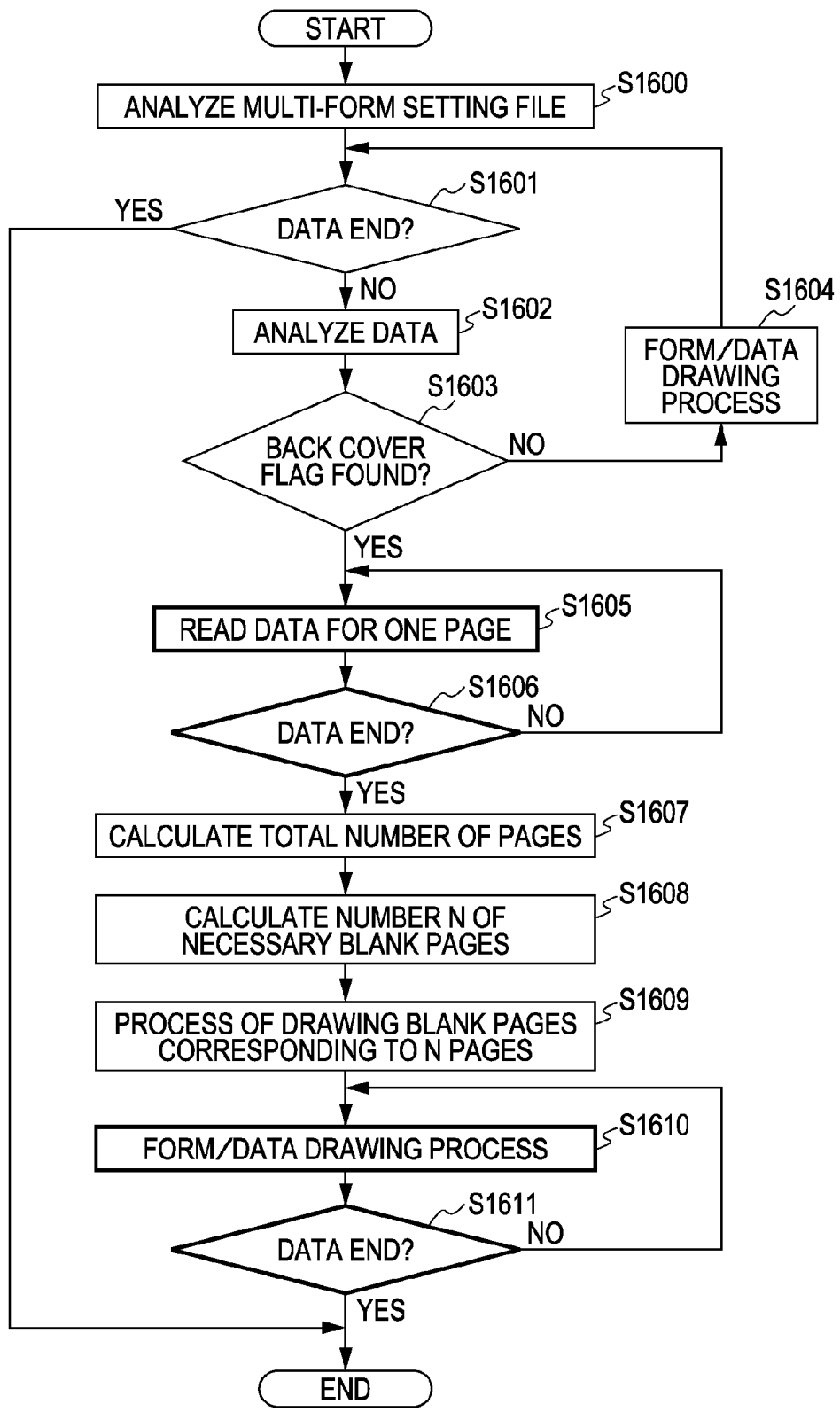

```
<JOB ATTRIBUTE>
PRINT ATTRIBUTE=BOOKBINDING        ⌒501
</JOB ATTRIBUTE>

<FORM A>
FORM=C:\Form\form 1.fcp             ⌒502
PRINT ATTRIBUTE=~
</FORM A>
<FORM B>
FORM=C:\Form\form 2.fcp             ⌒503
PRINT ATTRIBUTE=~
</FORM B>
```

# INFORMATION PROCESSING APPARATUS, CONTROL METHOD THEREFOR, AND COMPUTER READABLE MEDIUM FOR INDICATING A LAST PAGE AND BLANK PAGES IN BOOKBINDING PRINTING

BACKGROUND OF THE INVENTION

1. Field of the Invention

The present invention relates to an information processing apparatus and an information processing method, more specifically, allowing a user to output a printing result as desired while performing efficient processing.

2. Description of the Related Art

Recently, due to the improved capabilities of printers, bookbinding printing has become readily available in office environments. With the availability of bookbinding printing, an increasing number of users desire to perform bookbinding printing to generate documents such as copies of insurance policies. In the bookbinding printing process, a user may desire to always place a specified final page on the end (i.e., the back cover) of the book. The term "bookbinding printing" as used herein assumes that a plurality of sheets are stacked and folded in half to generate a book.

To this end, a technique has been developed in which a blank page is inserted between print job pages to adjust the number of pages so that a final page can be placed on the back cover of the book. FIGS. 12A and 12B show examples of bookbinding printing in which blank pages are inserted to place a final page on the back cover of the book. FIGS. 12A and 12B are prior art diagrams showing a printed product produced using bookbinding printing, as viewed from the lateral side thereof, where the total number of pages for a print job is five.

Sheets of paper 703 and 704 are placed against one another. In a book 701 produced using a standard bookbinding printing method shown in FIG. 12A, three blank pages are additionally inserted after a final page, or the fifth page. In a bookbinding printing method shown in FIG. 12B in which a page to be placed on the back cover (last page) of a book 702 is designated, on the other hand, three blank pages are inserted before the fifth page. As a result, the fifth page is printed on the back cover of the book 702.

A technique of the related art for producing the book 702 shown in FIG. 12B is disclosed in Japanese Patent Laid-Open No. 11-224027. In this technique, first, all pages of a paper document are scanned, and the number of blank pages required is determined on the basis of the total number of pages of the paper document. Then, the determined number of blank pages are inserted so that a final page can be placed on the back cover of the book.

There has also been developed an application for inserting a blank page during the printing of a file of which the total number of pages is determined in advance, such as a Portable Document Format (PDF) document.

However, there arises a problem with the technique of the related art described above when it is applied to an application for performing overlay printing using a fixed section (form) of a document and attachment data.

An application for performing overlay printing will be described with reference to FIG. 13. FIG. 13 is a diagram showing an example of overlay printing using form data and attachment data. First, a user specifies a multi-form setting file 301 and an attachment data item 302 in an overlay printing library. FIG. 14 is a diagram showing an example of the content of a multi-form setting file. The multi-form setting file includes a job attribute 501 and form attributes 502 and 503. In the job attribute 501, a setting such as a print attribute of the overall job is described. In the example shown in FIG. 14, bookbinding printing is designated as a job attribute. In the form attributes 502 and 503, reference information of individual forms and the designated print attribute are described. For example, the form attribute 502 describes that a form having a file name "form 1.fcp" is to be used. A combination of settings in the form attribute 502 is defined as a name "form A". A combination of settings in the form attribute 503 is defined as a name "form B".

Forms will now be described. FIG. 15 is a diagram showing an example of a form. The form is composed of a fixed section 401 that is printed fixedly regardless of what kind of data is to be inserted, and a field (region) 402 into which attachment data is inserted.

An attachment data file will now be described. FIG. 16 is a diagram showing an example of an attachment data file 600. The attachment data file 600 is composed of form designation sections 601 and 603, and attachment data sections 602 and 604 to be inserted in the field 402.

An overlay printing application reads the attachment data file 600 and the multi-form setting file shown in FIG. 14, and analyzes designated forms. In the example shown in FIG. 16, the "form A" is designated. Then, the overlay printing application analyzes the multi-form setting file shown in FIG. 14 to recognize that the form to be used in the "form A" is represented by "form 1.fcp". Then, the overlay printing application inserts attachment data "aaa" 309, which is designated in the data section 602, into the "form 1.fcp" field. The overlay printing application executes the process described above on all attachment data items 309-311 to obtain printing results 306 to 308 shown in FIG. 13. The series of processes described above is referred to as "overlay printing".

As described above, an overlay printing application generally generates a print job while analyzing attachment data. Therefore, the total number of pages for the print job is variable and depends on the attachment data. In other words, the total number of pages is not fixed during the printing process performed in the overlay printing application and is unknown until all attachment data items have been analyzed. If the total number of pages is unknown, it is difficult to calculate the number of blank pages to be inserted to place a final page on the back cover of the book even with the use of the technique of the related art described above. In the overlay printing application configured to generate a print job while analyzing attachment data, therefore, a final page may not necessarily be placed on the back cover of the book and a user may not necessarily output a printing result as desired.

Such a situation is illustrated in FIG. 17. FIG. 17 is a diagram showing a problem with the related art. In FIG. 17, the total number of pages is three by way of example. An overlay printing application can determine, after analyzing all attachment data items, the need for one blank page to be inserted. However, it is too late to insert the blank page because the individual pages have been subjected to a drawing process. After a merge process using attachment data and form data has been completed for data for the first page, the overlay printing application issues drawing data to a graphical device interface (GDI) module of an operating system (OS) to print the data 801 for the first page. Data 802 for the second page and data 803 for the third page are further issued in a sequential manner. When the overlay printing application recognizes that the third page is the final page after issuing drawing data for the third page to the GDI module, it is too late to insert a blank page between the second and third pages.

It is therefore difficult to place the third page on the back cover (last page) of the book and the user may not necessarily obtain the book as desired.

The overlay printing application can execute a process of generating a print job after determining the total number of pages in advance by analyzing all attachment data items, thereby inserting a blank page so that a final page can be placed on the back cover of the book. However, this method may cause a problem of increasing the processing time.

SUMMARY OF THE INVENTION

An embodiment of the present invention provides a technique that allows a user to output a printing result as desired while performing efficient processing.

In an aspect of the present invention, there is provided an information processing apparatus for combining attachment data to be attached and a form in which the attachment data is placed, including a setting unit configured to set identification information indicating a last page of a book to the form, a determining unit configured to determine whether the identification information has been set in a form in which the attachment data is to be placed, and a deriving unit configured to derive the number of pages to be inserted to place a page containing the form on the last page of the book when the determining unit determines that the identification information has been set in the form.

Further features of the present invention will become apparent from the following description of exemplary embodiments with reference to the attached drawings.

BRIEF DESCRIPTION OF THE DRAWINGS

FIG. 1A is a diagram showing an example of a system that prints data such as data of a document or the like.

FIG. 2 is a diagram of a system similar to the system shown in FIG. 1A, except for an engine server including a library, which is a separate version of a library in a form creation application.

FIG. 3 is a diagram showing an example in which a multi-form setting file is edited using the form creation application.

FIG. 11 is a flowchart showing an example of a process for generating a print job according to a fourth embodiment of the present invention.

DESCRIPTION OF THE EMBODIMENTS

Exemplary embodiments of the present invention will be described hereinafter with reference to the drawings.

Figure 1A:
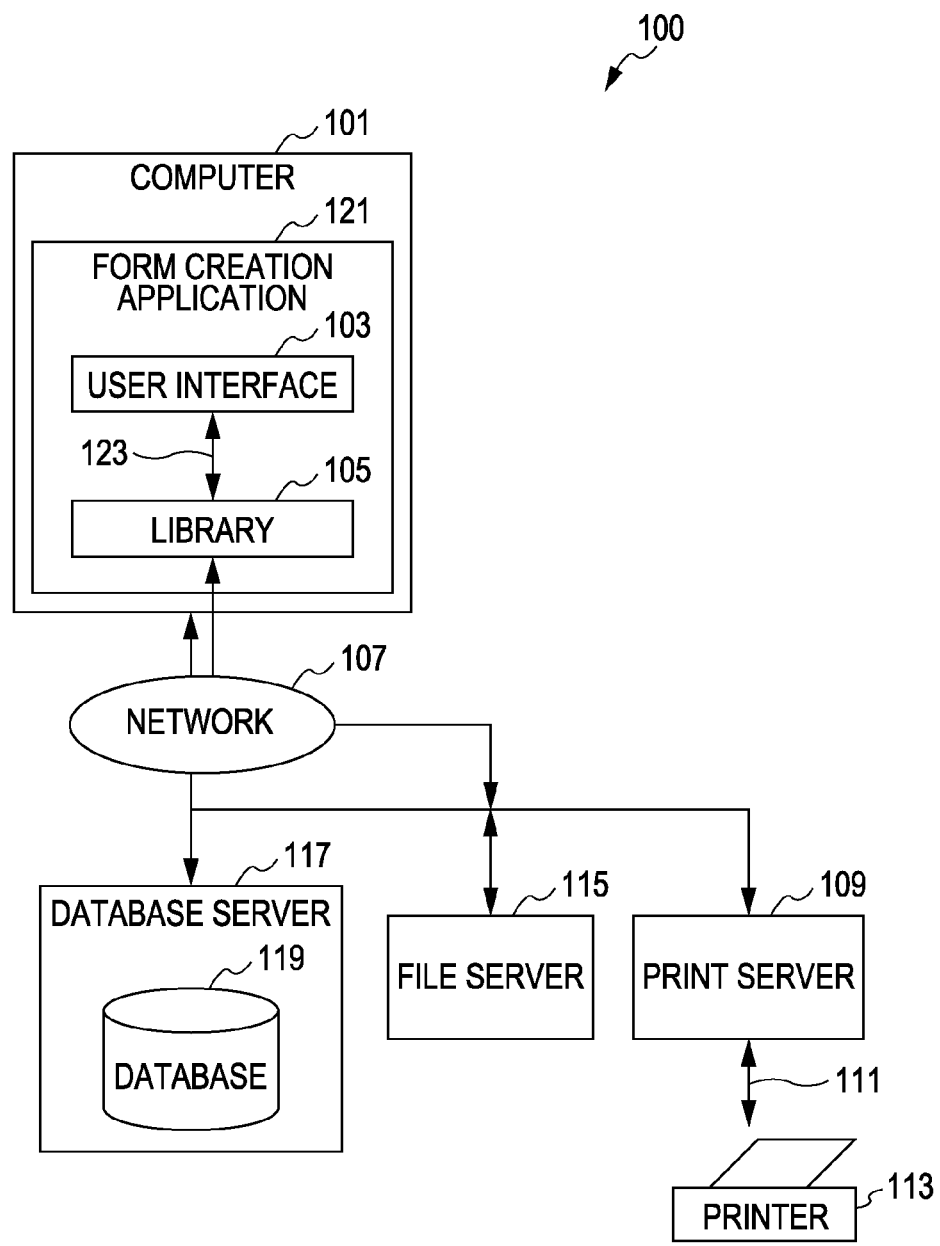

FIG. 1A is a diagram showing an example of a system 100 that prints data of a document or the like. The functions and the like shown in FIG. 1A are implemented by a computer (information processing apparatus) 101 shown in FIG. 1B. The steps of performing layout editing and editing or printing of a setting file are executed according to an instruction of software executed by a computer module (computer 101). The software (program) is stored in, for example, a storage medium such as a hard disk drive (HDD) 140 described below. The software is loaded into a memory unit 136 or any other suitable device from the storage medium, and is executed by a central processing unit (CPU) 135.

The computer 101 is connected to an input device including a keyboard 132 and a pointing device such as a mouse 133, and is connected to an output device including a display device 144 and a local printer 145 depending on the situation. An input/output interface (I/O interface) 138 serves to connect the computer 101 to a network 107 so that the computer 101 can be connected to another computer device or any other suitable device within the system 100. Typical examples of the network 107 include a local area network (LAN) and a wide area network (WAN).

The computer 101 typically includes at least one CPU 135, the memory unit 136, which includes a random access memory (RAM) and a read-only memory (ROM), a video interface 137, and the I/O interface 138. The computer 101 further includes an I/O interface 143 used for the keyboard 132 and the mouse 133. A storage device 139 typically includes the HDD 140 and a floppy (registered trademark in Japan) disk drive (FDD) 141.

Figure 1B:
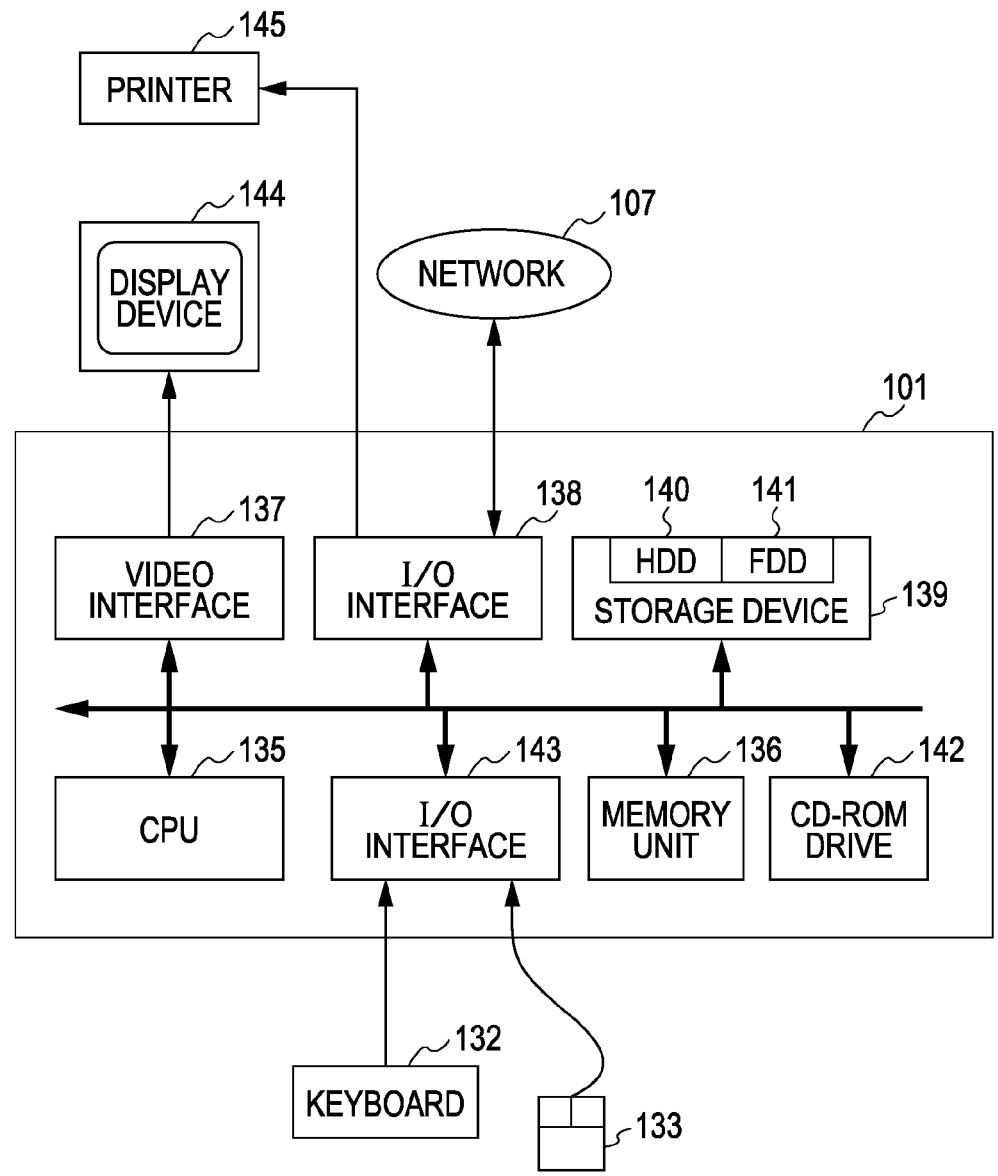
FIG. 1B is a diagram showing an example structure of a computer.

The computer 101 may further include a magnetic tape drive, which is not shown in FIG. 1B. A CD-ROM drive 142 reads data or the like recorded on a CD-ROM from the CD-ROM.

As described above, the CPU 135 executes software (or program) to implement functions or processes according to the present embodiment, which will be described below.

A form creation application 121 shown in FIG. 1A, is typically recorded on the HDD 140, and is loaded into the memory unit 136 or any other suitable device and executed by the CPU 135.

Referring back to FIG. 1A, the form creation application 121 is configured to create a form or to instruct the execution of a printing operation, and includes two software components. One of the components is a library 105. The library 105 is a software component configured to perform processing such as overlay printing processing. The other component is a user interface 103. The user interface 103 provides a function that allows a user to create and edit a form, a setting file, etc. The user interface 103 and the library 105 communicate with each other via a communication channel 123. The term "overlay" refers to a process of merging attachment data with a form having a region in which the attachment data is to be entered to generate drawing data.

A data source for generating a document is generally stored in a typical database 119 residing on a database server 117 constructed by another computer on which a database application is working. The computer 101 communicates with the database server 117 by using the function of the network 107. The form creation application 121 generates a form or setting file which is to be stored in the computer 101 or a file server 115 constructed by another computer. Such a document is stored in a local file system of the computer 101 or the file server 115, or is directly printed using a printer 113. A print server 109 is a computer that provides a printer, which is not directly connected to the network 107, with a network function. The print server 109 and the printer 113 are connected to each other via a typical communication channel 111.

FIG. 2 is a diagram showing a system similar to the system 100 shown in FIG. 1A, except for an engine server 227 including a library 225, which is a separate version of the library 105. A description of similar components as those described in FIG. 1A has been omitted. The engine server 227 is a typical computer. A form stored in the file server 115 is overlay-printed, for the purpose of printing or any other purpose as required, with data stored in the database 119 by the library 225 in order to generate a document. Such an operation is requested through the user interface 103 or is implemented by a user issuing an instruction to the library 225 through an interface 228.

First Embodiment

In a first embodiment of the present invention, by way of example, a flag (identification information) indicating a back cover of a book is set in a form attribute of a multi-form setting file.

Figure 16:
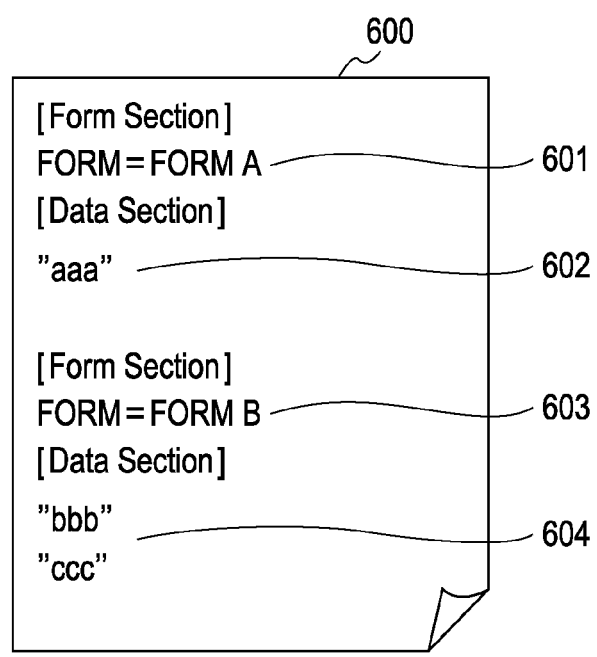
FIG. 16 is a prior art diagram showing an example of an attachment data file.
Figure 17:
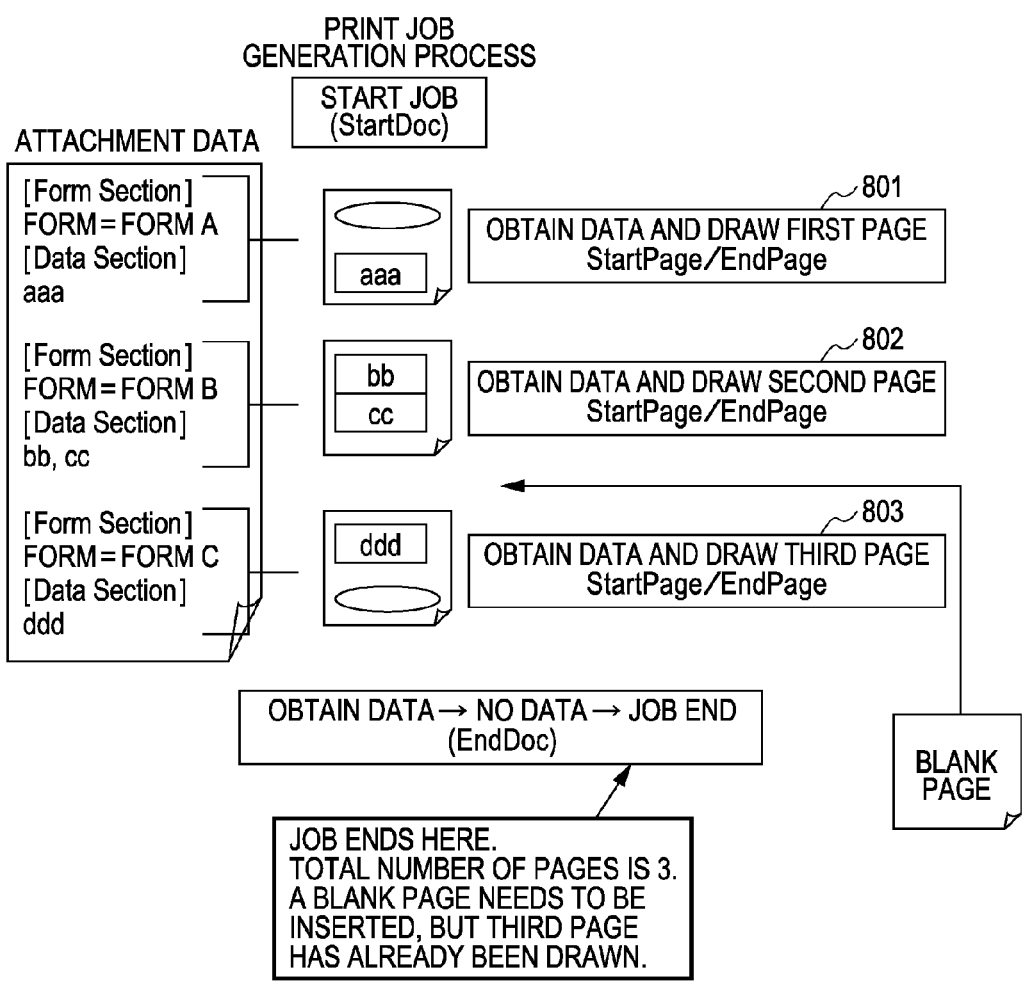
FIG. 17 is a prior art diagram showing a problem with the related art.

A multi-form setting file, a form, and an attachment data file will now be described with reference to FIGS. 14 to 16.

Figures 14, 15:
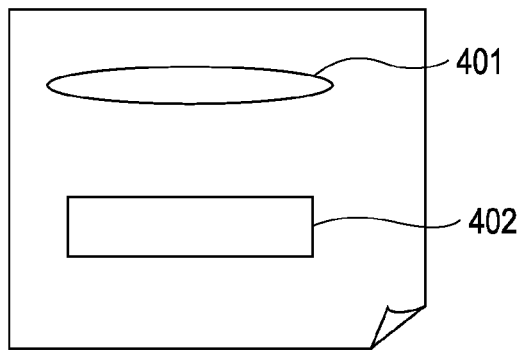
FIG. 14 is a prior art diagram showing an example of the content of a multi-form setting file.
FIG. 15 is a prior art diagram showing an example of a form.

FIG. 14 is a prior art diagram showing an example of the content of a multi-form setting file. The multi-form setting file includes a job attribute 501 and form attributes 502 and 503. In the job attribute 501, a setting such as a print attribute of the overall job is described. In the example shown in FIG. 14, bookbinding printing is designated as a job attribute. In the form attributes 502 and 503, reference information of individual forms as form information and the designated print attribute are described.

Forms will now be described. FIG. 15 is a prior art diagram showing an example of a form. The form is composed of a fixed section 401 that is printed fixedly regardless of what kind of data is to be inserted, and a field (region) 402 into which attachment data is inserted.

An attachment data file will now be described. FIG. 16 is a prior art diagram showing an example of an attachment data file 600. The attachment data file 600 is composed of form designation sections 601 and 603, and attachment data sections 602 and 604 to be inserted in the field 402.

Figure 12A:
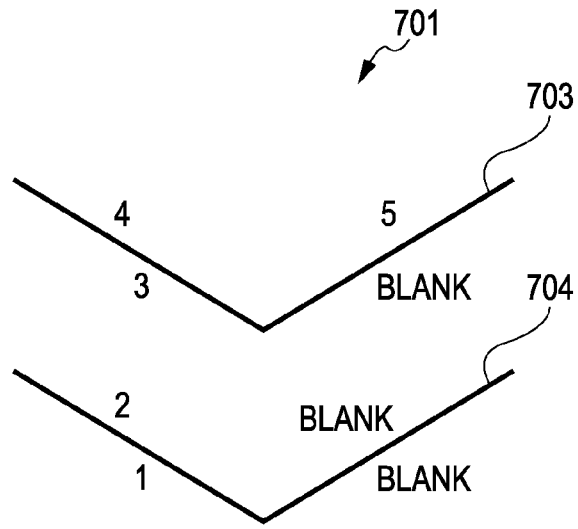
FIGS. 12A to 12B are prior art diagrams showing a printed product produced using bookbinding printing, as viewed from the lateral side thereof.
Figure 12B:
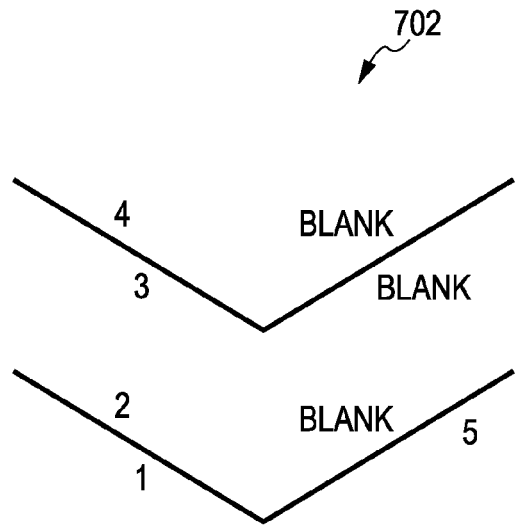
Figure 13:
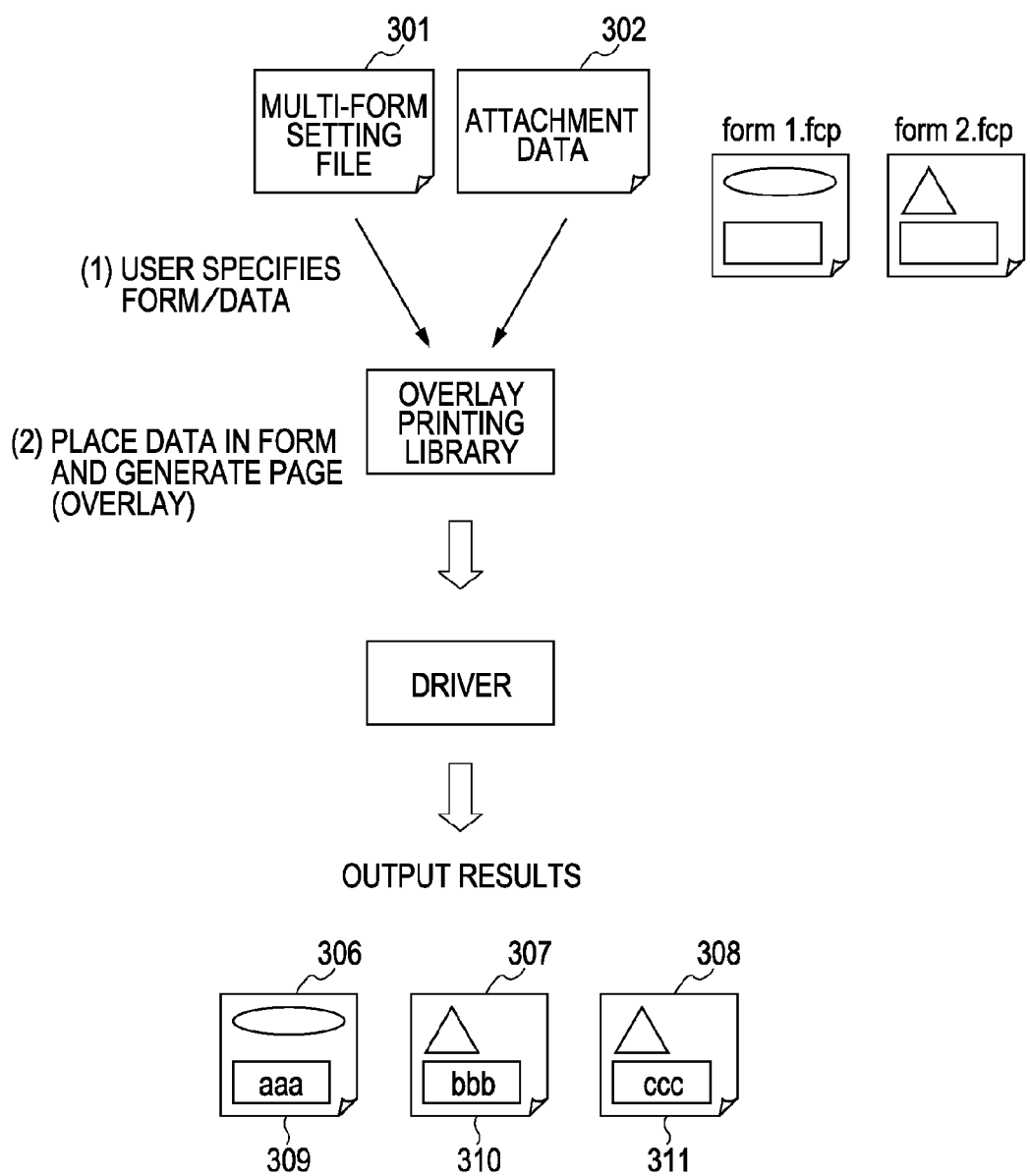
FIG. 13 is a prior art diagram showing an example of overlay printing using form data and attachment data.

A method of setting a flag (identification information) in a multi-form setting file will now be described. FIG. 3 is a diagram showing an example in which a multi-form setting file is edited using the form creation application 121 (the editor function of the form creation application 121). In FIG. 3, by way of example, the multi-form setting file is opened by the form creation application 121. In a left-hand region 1002 of the form creation application 121, the content of the multi-form setting file is displayed page-by-page in a tree fashion. In a right-hand region 1003 of the form creation application 121, a currently selected form is displayed. In the example shown in FIG. 3, the user is currently selecting a form C 1001. Specifically, a form stored in a storage destination in which the form C described in the multi-form setting file is stored is displayed. The user selects a form to be placed on the back cover of the book using a mouse or any other suitable device. In the example shown in FIG. 3, as a result of an instruction given by the user to open the property of the form C, a property dialog 1004 of the form C is displayed on the display device 144 or any other suitable device. On the property dialog 1004, the user turns on a checkbox indicating that the currently selected form is to be printed on the back cover of the book (setting of the flag). The form creation application 121 can also accept a setting for executing bookbinding printing according to a user's instruction. The term "bookbinding" refers to a process of stacking a plurality of sheets and folding the sheets in half in the manner shown in, for example, FIGS. 12A and 12B. Other types of bookbinding such as fascicle bookbinding are also available, which are not discussed in detail herein because of the known art.

Figure 4:
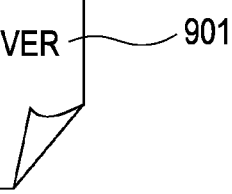
FIG. 4 is a diagram showing an example of a multi-form setting file created using the form creation application according to the operation shown in FIG. 3.

FIG. 4 is a diagram showing an example of a multi-form setting file created by the form creation application 121 according to the operation shown in FIG. 3. A flag indicating that the form C is to be placed on the "back cover" (last page) is set in a print attribute 901 of the form C. In the setting file shown in FIG. 4, which is generated in order to perform bookbinding printing, "bookbinding" is described in the job attribute. A setting such as a print attribute of the overall job is described in the job attribute.

Figure 5:
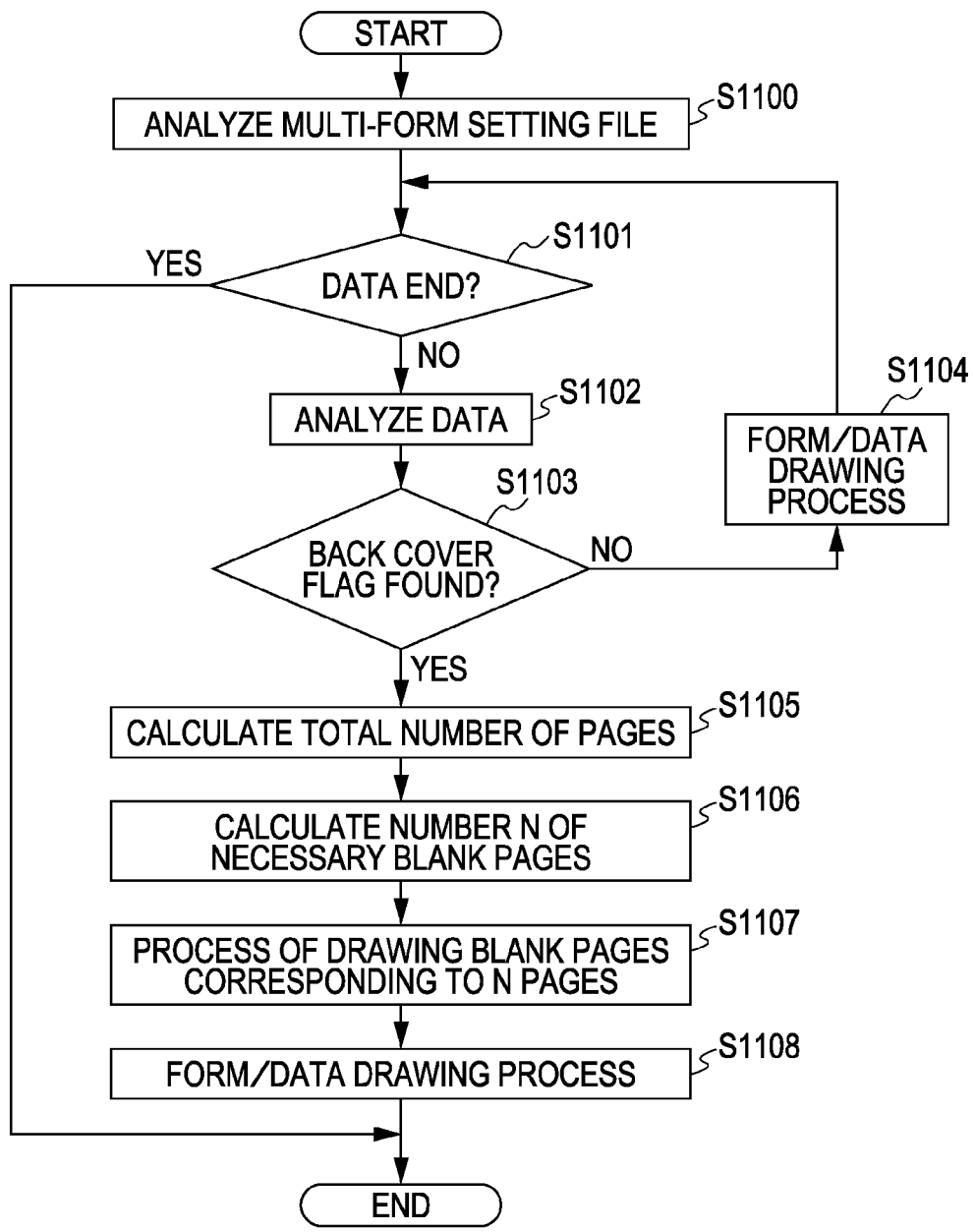
FIG. 5 is a flowchart showing an example of a process for generating a print job according to a first embodiment of the present invention.
Figure 6:
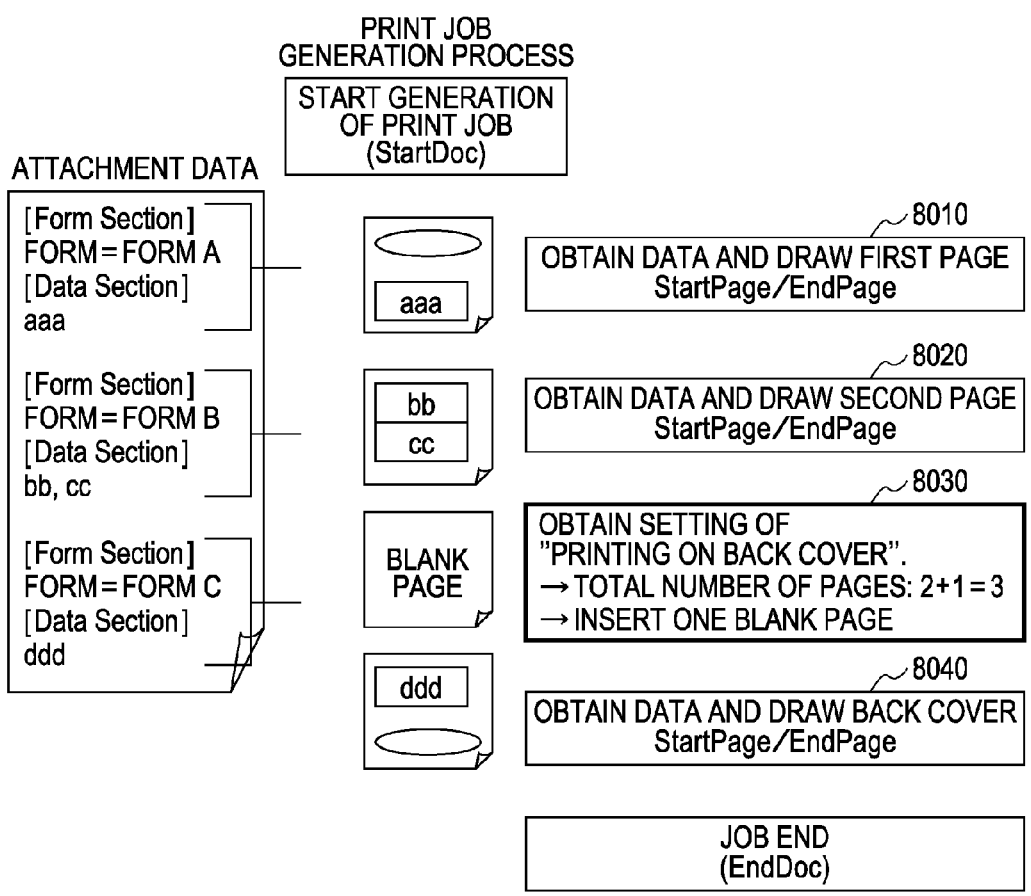
FIG. 6 is a diagram showing a more specific example of a print job generation process.

A process shown in a flowchart of FIG. 5 will now be described with reference to FIGS. 4 and 6. FIG. 5 is a flowchart showing an example of a process for generating a print job according to the first embodiment. FIG. 6 is a diagram showing a more specific example of a print job generation process.

In step S1100, the library 105 of the form creation application 121 analyzes a multi-form setting file specified by a user, and stores information described in the multi-form setting file.

In step S1101, the library 105 attempts to obtain one form attribute from the setting file stored in step S1100 to determine whether or not data ends. If a form attribute can be obtained, the library 105 determines that data does not end, and proceeds to step S1102. If a form attribute cannot be obtained, the library 105 determines that data ends, and ends the process shown in FIG. 5. In the multi-form setting file shown in FIG. 4, first, the library 105 attempts to obtain a form A, which is one of the form attributes. Since the form A can be obtained, the library 105 proceeds to step S1102.

In step S1102, the library 105 analyzes the print attribute, etc., of the form A.

In step S1103, the library 105 determines, based on a result of the analysis, whether or not a flag indicating the "back cover" (last page) is set in the print attribute of the form A. If a flag indicating the "back cover" (last page) is set, the library 105 proceeds to step S1105. If it is determined that a flag indicating the "back cover" (last page) is not set, the library 105 proceeds to step S1104. In the example shown in FIG. 4, a flag indicating the "back cover" (last page) is not set in the print attribute of the form A. Thus, the library 105 proceeds to step S1104.

In step S1104, the library 105 executes a drawing process using the form and the attachment data. In the example shown in FIG. 4, the first page is drawn using the FORM setting ("form1.fcp") and the print attribute of the form A and attachment data ("aaa") described in a designation section ("FORM=form A" shown in FIG. 6) of the form A (step 8010 of FIG. 6). At this time, the library 105 adds one page.

Then, in step S1101, the library 105 attempts to obtain one subsequent form attribute from the setting file stored in step S1100 to determine whether or not data ends. In the multi-form setting file shown in FIG. 4, the library 105 attempts to obtain a form B, which is one of the form attributes. Since the form B can be obtained, the library 105 proceeds to step S1102.

Then, the library 105 also executes the processing of steps S1102 to S1104 for the form B.

In step S1104, the library 105 performs drawing of the second page using the FORM setting ("form 2.fcp") and the print attribute of the form B and data ("bb" and "cc") described in a designation section ("FORM=form B" shown in FIG. 6) of the form B (step 8020 of FIG. 6). At this time, the library 105 adds one page.

Then, in step S1101, the library 105 attempts to obtain one subsequent form attribute from the setting file stored in step S1100 to determine whether or not data ends. In the multi-form setting file shown in FIG. 4, the library 105 attempts to obtain a form C, which is one of the form attributes. Since the form C can be obtained, the library 105 proceeds to step S1102.

In step S1102, the library 105 analyzes the print attribute, etc., of the form C.

In step S1103, the library 105 determines, based on a result of the analysis, whether or not a flag indicating the "back cover" (last page) is set in the print attribute of the form C. In the example shown in FIG. 4, since a flag indicating the "back cover" (last page) is set in the print attribute of the form C, the library 105 proceeds to step S1105.

In step S1105, the library 105 calculates the total number of pages of the book associated with the print job (calculation of the total number of pages). In the multi-form setting file shown in FIG. 4 and the attachment data file shown in FIG. 6, the library 105 determines that the total number of pages is three (step 8030 of FIG. 6). That is, by adding one page containing the form with a flag indicating the last page to the drawing data for the generated two pages, the library 105 determines the total number of pages (three pages). As shown in FIG. 6, attachment data items and forms are set in association with each other. The term "attachment data file" refers to a data file including a combination of a form to be used and an attachment data item. While the attachment data file shown in FIG. 6 includes attachment data items to be placed on a plurality of pages, the present invention is not limited thereto.

In step S1106, the library 105 determines the number (N) of blank pages to be inserted in order to place the form C on the back cover (last page) of the book (calculation of the number of pages to be inserted). More specifically, the library 105 sets a remainder, which is obtained by calculating (4×number of sheets)÷total number of pages, as the number (N) of blank pages. The number of sheets is given by dividing the total number of pages by 4 (i.e., total number of pages÷4). If there is a remainder, a rounded up value is regarded as the number of sheets. For example, when the total number of pages is 5, the number of sheets is "2". For example, when print data for eight pages is to be printed on one printing sheet, the value "4" given in the equation above is replaced with the value "8" to perform a calculation.

In the multi-form setting file shown in FIG. 4 and the attachment data file shown in FIG. 6, the library 105 determines a remainder of "1", which is obtained by calculating (4×1)÷3, as the number of blank pages (step 8030 of FIG. 6). Therefore, the library 105 inserts one blank page in order to place the form C on the back cover (last page) of the book.

In step S1107, the library 105 performs a process of drawing blank pages corresponding to N pages (step 8030 of FIG. 6).

In step S1108, the library 105 performs drawing of the back cover (last page) using the FORM setting ("form 3.fcp") and the print attribute of the form C and data ("ddd") described in a designation section ("FORM=form C" shown in FIG. 6) of the form C (step 8040 of FIG. 6).

With the process described above, by setting a flag in a multi-form setting file, the library 105 can perform a sequential process to insert a number of blank pages necessary to place a page desired by a user on a back cover of a book. Therefore, the user can output a printed product as desired without reducing the processing efficiency.

Second Embodiment

In the first embodiment, a flag indicating a back cover of a book is set in a multi-form setting file, by way of example. In a second embodiment of the present invention, the flag is set in an attachment data file, by way of example.

Figure 7:
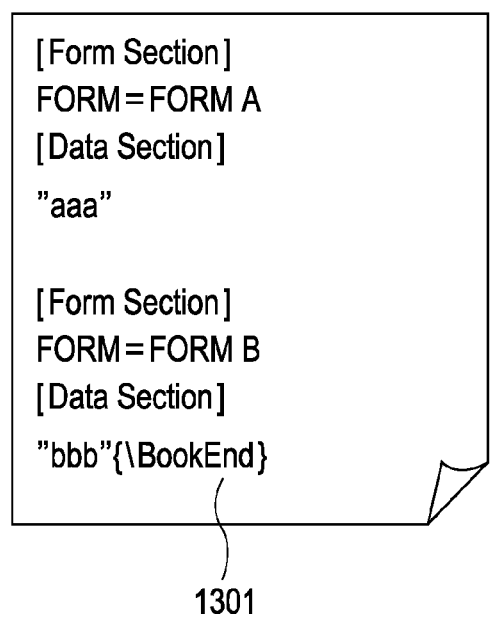
FIG. 7 is a diagram showing an example in which a flag is set in attachment data.

FIG. 7 is a diagram showing an example in which the flag is set in an attachment data file. In the example of attachment data file shown in FIG. 7, a "{\BookEnd}" flag (description) 1301 is described after attachment data "bbb". The "{\BookEnd}" flag 1301 is a character string defined in advance by the library 105, and means a back cover of a book. The flag may be any character string as far as the character string is defined in advance.

When the flag 1301 is read at the time of the analysis of attachment data, the library 105 determines that a page containing the attachment data is to be placed on the back cover of the book, and performs the process described in the first embodiment.

More specifically, the library 105 determines whether or not a "BookEnd" flag indicating the last page is set in a section assigned the form A as a form in the attachment data file shown in FIG. 7. Since the flag is not set, the total number of pages is increased by one.

Then, the library 105 determines whether or not a "BookEnd" flag indicating the last page is set in a section assigned the form B a form in the attachment data file shown in FIG. 7. Since the "BookEnd" flag is set, the current total number of pages is increased by one page containing the attachment data file. As a result, the total number of pages is determined (two pages), and the equation above is calculated (a remainder determined by calculating (4×number of sheets)÷total number of pages). Thus, by calculating (4×1)÷2, a remainder of "2" is determined. Therefore, the library 105 can print the data "bbb" on the back cover (last page) of the book by inserting two blank pages for the attachment data shown in FIG. 7.

Third Embodiment

In the first and second embodiments, a flag indicating a back cover of a book is set in a multi-form setting file or attachment data, by way of example. In a third embodiment of the present invention, no flag is set, by way of example.

Figure 8:
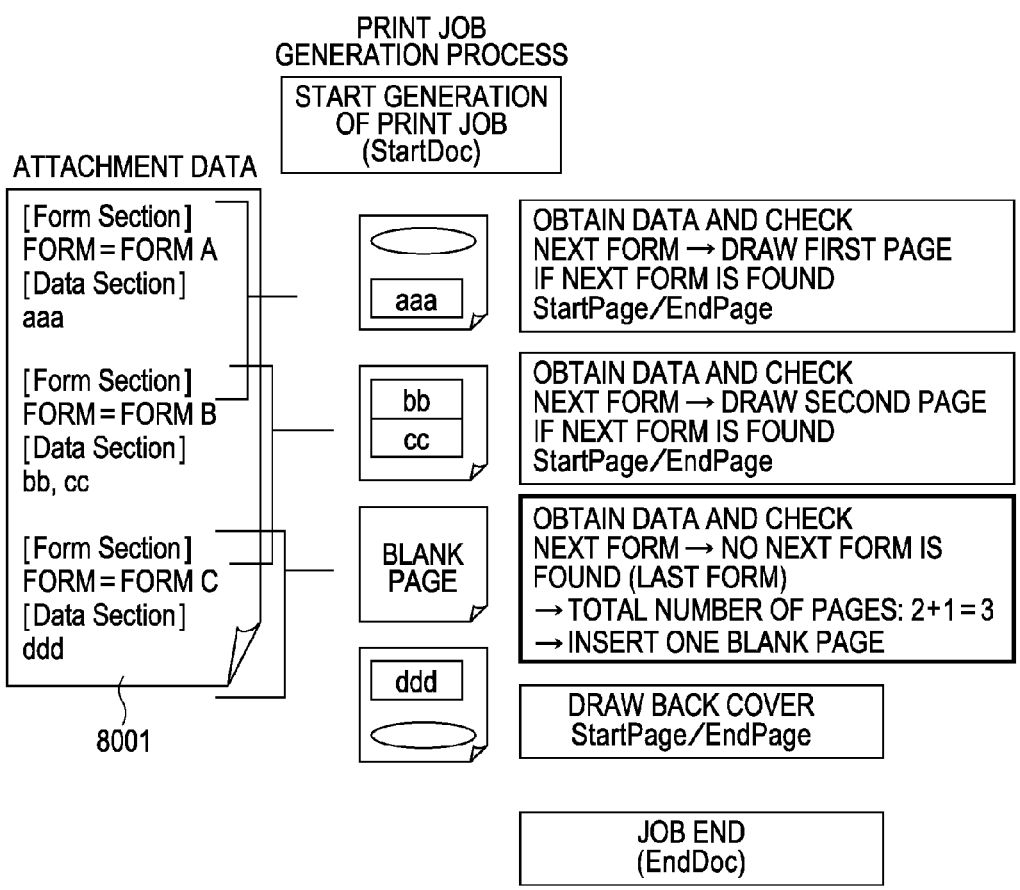
FIG. 8 is a diagram showing a process of a third embodiment of the present invention.

FIG. 8 is a diagram showing a process of the third embodiment. The library 105 analyzes data for a currently processed page from attachment data and further determines whether or not a form has been designated for a subsequent page. If no subsequent form has been designated, the library 105 determines that the current page is to be placed on the back cover of a book, and executes the process described above.

More specifically, the library 105 determines whether or not a form has been designated for a subsequent page, as well as analyzing a section assigned the form A as a form in an attachment data file 8001 shown in FIG. 8. In FIG. 8, since the form B has been designated as a form for the subsequent page, the form creation application 121 performs drawing of the section assigned the form A as a form.

Then, the library 105 determines whether or not a form has been designated for a subsequent page, as well as analyzing a section assigned the form B as a form in the attachment data file 8001 shown in FIG. 8. In FIG. 8, since the form C has been designated as a form for the subsequent page, the form creation application 121 performs drawing of the section assigned the form B as a form.

When a section assigned the form C as a form in the attachment data file 8001 shown in FIG. 8 is analyzed, it is also determined whether or not a form has been designated for a subsequent page. In FIG. 8, since a form has not been designated for the subsequent page, the library 105 recognizes that the form C currently being analyzed is to be placed on the last page, and determines the total number of pages. Since drawing data for one page is generated using the attachment data associated with the form C, the form creation application 121 can determine that the total number of pages is three. The current total number of pages is determined and a remainder is determined by calculating the equation above, i.e., (4×number of sheets)÷total number of pages.

Therefore, the library 105 analyzes twice only the form designation section in attachment data to thereby insert a blank page without significantly increasing the processing time. That is, it is only required to perform only an analysis of whether or not a form designation section is present without performing an analysis of the overall attachment data file 8001 shown in FIG. 8. This results in more efficient processing than that of the related art and can reduce the load imposed on a user to set a flag.

According to the third embodiment, a back cover page can be automatically set without setting a flag, whereby, advantageously, the user's labor can be reduced. The present embodiment is effective, for example, when the last page is always to be placed on a back cover of a book regardless of the setting of a print job.

Fourth Embodiment

In the first and second embodiments, it is assumed that the number of pages generated using a form with a flag indicating a last page is one, by way of example. In the third embodiment, it is also assumed that when it is determined that a form has not been designated for a subsequent page, the number of pages generated using attachment data currently being processed is one. In some cases, however, a user may desire to collectively place a plurality of pages on the last page of a book and pages previous to the last page.

Figure 9:
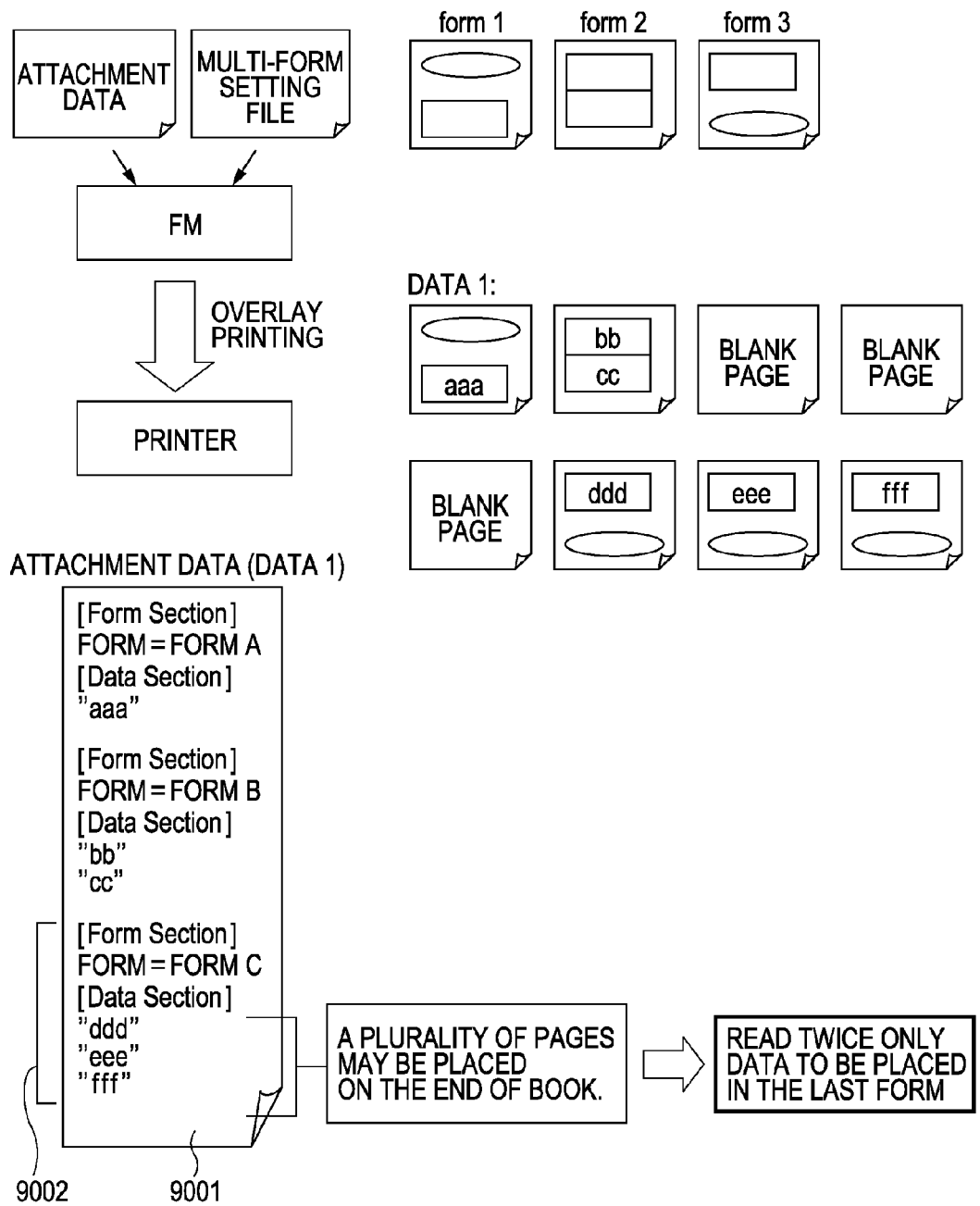
FIG. 9 is a diagram showing an example in which a plurality of pages are to be placed on and near the back cover of a book using a single form.

Thus, in a fourth embodiment of the present invention, a plurality of pages are collectively placed on the last page of a book and pages previous to the last page. The present embodiment is effective, for example, in a case where the specifications of a certain product are to be collectively placed on last few pages of a brochure. FIG. 9 is a diagram showing an example in which a plurality of pages to be collectively placed on last few pages of a book are output using a single form. In the example shown in FIG. 9, the number of pages to be collectively placed on last few pages of a book is three.

Figure 10:
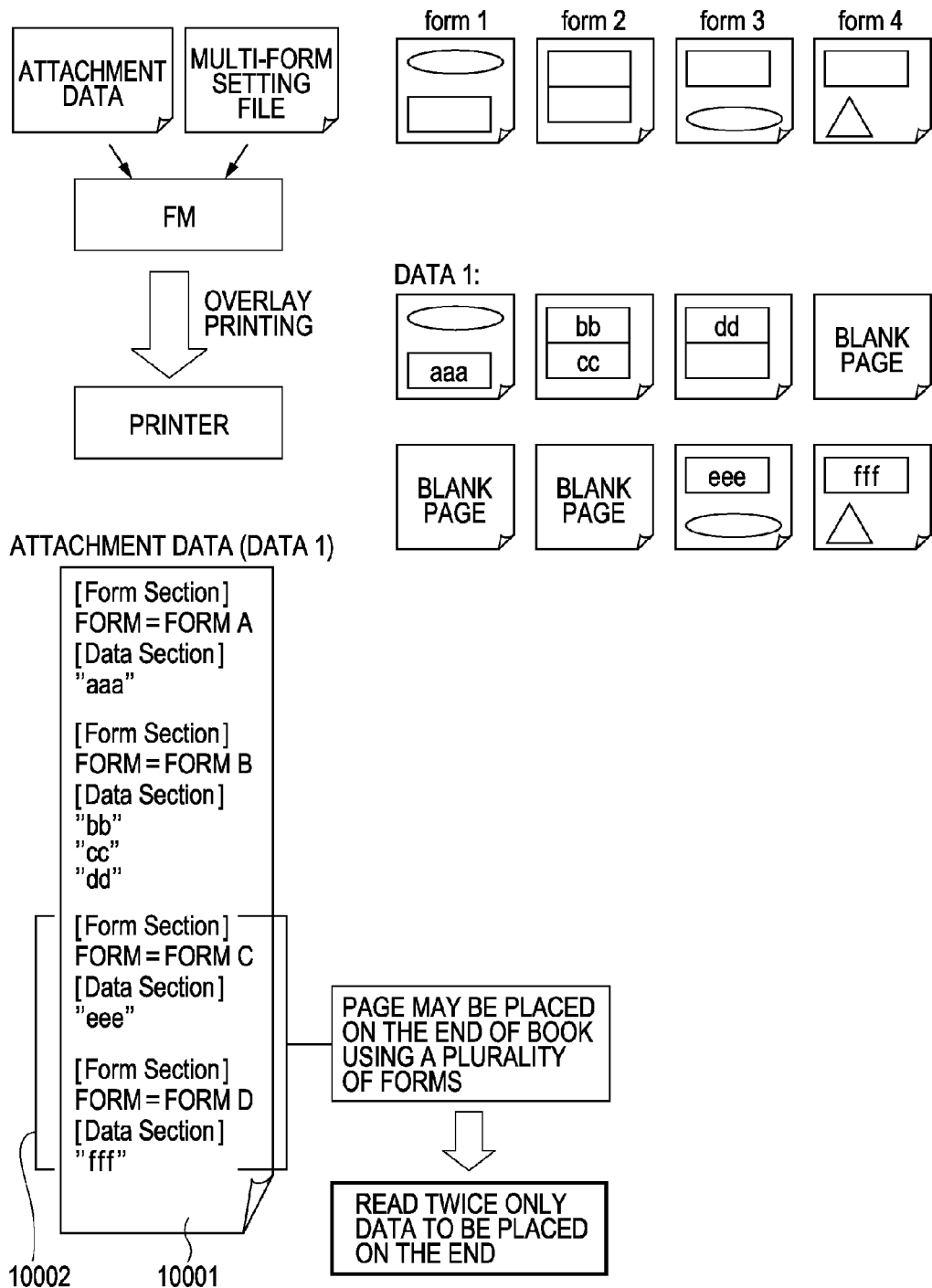
FIG. 10 is a diagram showing an example in which a plurality of pages are to be placed on and near the back cover of a book using a plurality of forms.

FIG. 10 is a diagram showing an example in which a plurality of pages to be placed on last few pages of a book are output using a plurality of forms.

FIG. 11 is a flowchart showing an example of a process for generating a print job according to the fourth embodiment.

The processing of steps S1600 to S1604 is similar to the processing of steps S1100 to S1104 shown in FIG. 5 so their descriptions have been omitted.

In step S1605, the library 105 reads attachment data for one page to be placed in a form assigned a flag indicating a last page from an attachment data file 9001, and counts (or measures) the number of pages. In the attachment data file 9001 shown in FIG. 9, the library 105 reads attachment data "ddd" for one page corresponding to a form (the form C shown in FIG. 4) assigned a flag indicating a last page.

In step S1606, the library 105 determines whether or not subsequent data exists. If it is determined that no subsequent data exists, the library 105 proceeds to step S1607. If it is determined that subsequent data exists, the library 105 proceeds to step S1605.

In the example of the attachment data file 9001 shown in FIG. 9, subsequent data exists, and the library 105 proceeds to step S1605 and reads attachment data "eee". Then, in step S1606, the library 105 again determines whether or not subsequent data exists. In the example of the attachment data file 9001 shown in FIG. 9, subsequent data exists, and the library 105 proceeds to step S1605 and reads attachment data "fff". Then, in step S1606, the library 105 again determines whether or not subsequent data exists. In the example of the attachment data file 9001 shown in FIG. 9, no subsequent data exists, and the library 105 proceeds to step S1607.

In step S1607, the library 105 determines the total number of pages using the data drawn in S1604 and the data read in step S1605. In a combination of the multi-form setting file 901 shown in FIG. 4 and the attachment data file 9001 shown in FIG. 9, the library 105 determines that the total number of pages is five.

In step S1608, the library 105 determines the number (N) of blank pages to be inserted in order to collectively place the pages containing the form C on last few pages of a book using the total number of pages determined in step S1607 and the equation above in which a remainder is determined by calculating (4×number of sheets)÷total number of pages). In the combination of the multi-form setting file 901 shown in FIG. 4 and the attachment data file 9001 shown in FIG. 9, the library 105 determines that the number of blank pages is three.

In step S1609, the library 105 executes a process of drawing blank pages corresponding to N pages. The process of drawing blank pages may be performed by actually drawing a number of blank pages corresponding to N pages or merely inserting a number of page break commands corresponding to N pages.

In step S1610, the library 105 performs drawing using the FORM setting ("form 3.fcp") and the print attribute of the form C and the attachment data ("ddd") for one page to be placed in the form designated as the form C. The library 105 determines whether or not subsequent data exists. If it is determined that no subsequent data exists, the library 105 ends the process shown in FIG. 11. If it is determined that subsequent data exists, the library 105 proceeds to step S1610.

In the example of the attachment data file 9001 shown in FIG. 9, subsequent data exists, and the library 105 also executes the processing of step S1610 described above on the attachment data "eee" and "fff". Then, in step S1611, the library 105 determines whether or not subsequent data exists. In the example of the attachment data file 9001 shown in FIG. 9, since no subsequent data exists, the library 105 ends the process shown in FIG. 11.

A combination of an attachment data file 10001 shown in FIG. 10 and a setting file in which a form D assigned a flag indicating a last page is added to the multi-form setting file 901 shown in FIG. 4 will now be described.

In the multi-form setting file 901 shown in FIG. 4, the form A or B is not assigned a flag indicating a last page. The library 105 executes drawing using the form A and attachment data "aaa" to be placed in the form A, and executes drawing using the form B and attachment data "bb", "cc", and "dd" to be placed in the form B.

Since the form C is assigned a flag indicating a last page, the library 105 reads attachment data "eee" for one page, which is to be placed in the form C. Since the form D is also assigned a flag indicating a last page, the library 105 reads attachment data "fff" for one page, which is to be placed in the form D.

As a result, the library 105 can determine that the total number of pages is five using the combination of the attachment data file 10001 shown in FIG. 10 and the multi-form setting file described above.

The library 105 can further determine that three blank pages are necessary using the determined total number of pages and the equation above (a remainder determined by calculating (4×number of sheets)÷total number of pages).

Then, the form creation application 121 performs a drawing process on the attachment data "eee" and "fff".

That is, it is only required to read twice only a section 10002 in the attachment data file 10001 shown in FIG. 10 at the time of the determination of the number of pages and at the time of the execution of the drawing, resulting in efficient printing compared with the related art.

With the process described above, it is only required to read twice only a necessary section (a section 9002 shown in FIG. 9 and the section 10002 shown in FIG. 10) instead of reading all pages twice, thus allowing a user to more efficiently output a printed product as desired than in the related art.

Other Embodiments

The advantages of the present invention may also be achieved as follows. A storage medium (or recording medium) having recorded thereon program code of software for implementing the functions of the foregoing embodiments is supplied to a system or an apparatus. The program code stored on the storage medium is read and executed by a central operation unit (such as a CPU or a micro processing unit (MPU)) of the system or apparatus. In this case, the program code read from the storage medium implements the functions of the foregoing embodiments, and the storage medium having the program code recorded thereon constitutes an embodiment of the present invention.

Furthermore, the central operation unit of the system or apparatus may execute the read program code. This allows an OS running on the system or apparatus to perform part of or the entirety of actual processing according to the instruction of the program code. The implementation of the functions of the foregoing embodiments by performing the processing described above may also fall within the scope of the present invention.

Moreover, the program code read from the storage medium may be written in a memory of a function extension board placed in the system or the apparatus or a function extension unit connected to the system or the apparatus. Thereafter, a CPU or the like of the function extension board or the function extension unit may execute part of or the entirety of actual processing according to the instruction of the program code. The implementation of the functions of the foregoing embodiments by performing the processing described above may also fall within the scope of the present invention.

When the present invention is applied to the storage medium, program code corresponding to the flowcharts described above is stored on the storage medium.

According to the foregoing embodiments, therefore, a page to be placed on the back cover of a book can be efficiently set during the generation of a job.

While exemplary embodiments of the present invention have been described in details, the present invention is not limited to such specific embodiments, and a variety of modifications and changes can be made without departing from the scope of the present invention set forth in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-285463 filed Nov. 1, 2007, which is hereby incorporated by reference herein in its entirety.

What is claimed is:

1. An information processing apparatus for combining attachment data to be attached and a form in which the attachment data is placed, comprising:
    a setting unit configured to set identification information indicating a last page of a book to the form and to set bookbinding printing, wherein the bookbinding printing is set for generating a book by stacking a plurality of sheets and then folding the stacked plurality of sheets in half;
    a determination unit configured to determine, when generating a print job by combining the attachment data and a plurality of forms included in a form setting file, whether the identification information is set to a form obtained from the form setting file;
    an output unit configured to output, as page data of the print job, first page data obtained by drawing processing based on the attachment data and a first form in a case where the determination unit determines that the identification information is not set to the first form, and to increment a total number of pages by one; and
    a deriving unit configured to increment the total number of pages by one in a case where the determination unit determines that the identification information is set to a second form obtained from the form setting file, and to derive, based on the total number of pages incremented by one, a number of blank pages to be inserted to print the attachment data and the second form on the last page of the book,
    wherein the output unit further outputs, as page data of the print job, the derived number of blank pages and second page data obtained by drawing processing based on the attachment data and the second form in the case where the determination unit determines that the identification information is set to the second form obtained from the form setting file.

2. The information processing apparatus according to claim 1, further comprising:
    a display unit configured to display the plurality of forms in the form setting file,
    wherein the setting unit sets the identification information to a form selected from the displayed plurality of forms.

3. A control method for combining attachment data to be attached and a form in which the attachment data is placed, comprising:
- setting bookbinding printing and identification information indicating a last page of a book to the form,
- wherein the bookbinding printing is set for generating a book by stacking a plurality of sheets and then folding the stacked plurality of sheets;
- determining, when generating a print job by combining the attachment data and a plurality of forms included in a form setting file, whether the identification information is set to a form obtained from the form setting file;
- determining that the identification information is not set to the first form, and to increment a total number of pages by one;
- incrementing the total number of pages by one in a case where it is determined that the identification information is set to a second form obtained from the form setting file,
- based on the total number of pages incremented by one, to derive a number of blank pages to be inserted to print the attachment data and the second form on the last page of the book,
- wherein the output unit further outputs, as page data of the print job, the derived number of blank pages and second page data obtained by drawing processing based on the attachment data and the second form in the case where it is determined that the identification information is set to the second form obtained from the form setting file.

4. The control method according to claim 3, further comprising:
- displaying the plurality of forms in the form setting file,
- wherein the identification information is set to a form selected from the displayed plurality of forms.

5. A non-transitory computer readable medium containing computer-executable instructions for executing a control method for combining attachment data to be attached and a form in which the attachment data is placed, the computer readable medium comprising:
- computer-executable instructions for setting bookbinding printing and identification information indicating a last page of a book to the form,
- wherein the bookbinding printing is set for generating a book by stacking a plurality of sheets and then folding the stacked plurality of sheets;
- computer-executable instructions for determining, when generating a print job by combining the attachment data and a plurality of forms included in a form setting file, whether the identification information is set to a form obtained from the form setting file;
- determining that the identification information is not set to the first form, and to increment a total number of pages by one;
- computer-executable instructions for incrementing the total number of pages by one in a case where it is determined that the identification information is set to a second form obtained from the form setting file,
- based on the total number of pages incremented by one, to derive a number of blank pages to be inserted to print the attachment data and the second form on the last page of the book,
- wherein the output unit further outputs, as page data of the print job, the derived number of blank pages and second page data obtained by drawing processing based on the attachment data and the second form in the case where it is determined that the identification information is set to the second form obtained from the form setting file,
- computer-executable instructions for setting bookbinding printing and identification information indicating a last page of a book to the form, wherein the bookbinding printing is set for generating a book by stacking a plurality of sheets and then folding the stacked plurality of sheets;
- computer-executable instructions for determining whether the identification information is set to a form obtained from a form setting file including a plurality forms;
- after determining that the identification information is not set to the first form, and to increment a total number of pages by one;
- computer-executable instructions for incrementing the total number of pages by one after determining that the identification information is set to a second form obtained from the form setting,
- wherein when the identification information indicating the last page of the book is set to a second form, a calculation is made based on the number of pages incremented by one, to derive the number of blank pages to be inserted to print the attachment data and the second form on the last page of the book,
- wherein the output unit outputs second page data based on the attachment data and the second form after the derived number of pages to be inserted are output.

6. The non-transitory control readable medium according to claim 5, further comprising:
- computer-executable instructions for displaying the plurality of forms in the form setting file,
- wherein the identification information is set to a form selected from the displayed plurality of forms.

* * * * *